United States Patent [19]
Barlow et al.

[11] 3,797,404
[45] Mar. 19, 1974

[54] SYSTEM FOR OPERATING MINIATURE VEHICLES

[75] Inventors: Gordon A. Barlow; Norman Kramer, both of Skokie, Ill.

[73] Assignee: Marvin Glass & Associates, Chicago, Ill.

[22] Filed: Jan. 31, 1973

[21] Appl. No.: 328,464

[52] U.S. Cl................ 104/149, 180/79, 104/130, 46/244 A
[51] Int. Cl.................. B60m 1/34, B61b 13/12
[58] Field of Search .......... 104/149, 247, 130, 242, 104/243, 244.1, 245; 180/79, 79.1; 46/244, 244 A, 244 D, 210

[56] References Cited
UNITED STATES PATENTS

| | | | |
|---|---|---|---|
| 2,993,299 | 7/1961 | Dingee et al. | 104/149 X |
| 3,098,454 | 7/1963 | Maestrelli | 104/247 |
| 3,198,279 | 8/1965 | Quinn | 180/79 |
| 3,393,762 | 7/1968 | Matson | 104/243 X |
| 3,453,970 | 7/1969 | Hansen | 104/149 |
| 3,712,238 | 1/1973 | Colovas | 104/130 |
| 3,467,311 | 9/1969 | Ernst | 104/149 |

*Primary Examiner*—Robert G. Sheridan
*Assistant Examiner*—R. B. Johnson
*Attorney, Agent, or Firm*—Coffee & Sweeney

[57] ABSTRACT

A system for operating electrically propelled miniature vehicles along a roadbed having side-by-side current conductive lanes with substantially flush tread surfaces and for remotely controlling the vehicles in a manner to turn out and pass one another at the will of the operator as the vehicles are transferred freely from one lane to another. The vehicles are driven by propulsion motors mounted on the vehicle body, for operating one or more driving wheels. Lever type flippers are mounted on the sides of the vehicles for movement outwardly in engagement with bordering side walls along the outer edges of the outermost lanes to urge the vehicle toward the opposite lane in response to a surge of current through a solenoid mounted on the vehicle and operatively associated with propulsion motor and the flippers.

8 Claims, 7 Drawing Figures

PATENTED MAR 19 1974 3,797,404
SHEET 1 OF 2
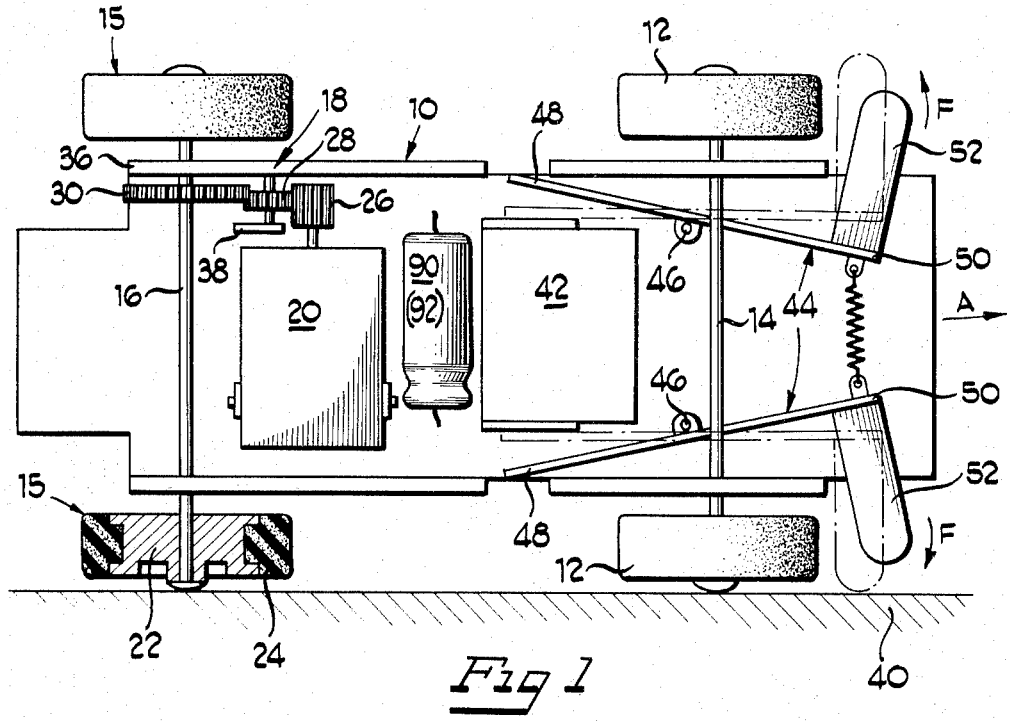
Fig 1
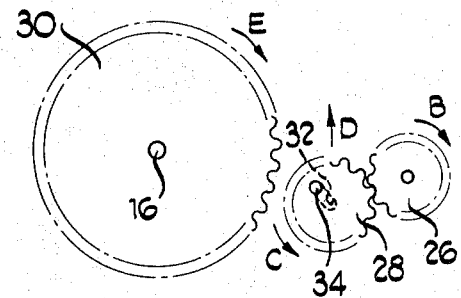
Fig 2
Fig 3A
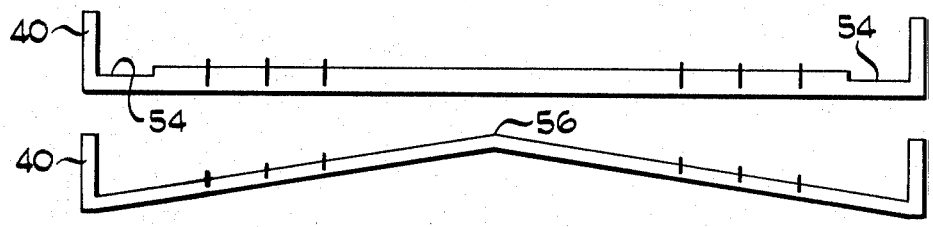
Fig 3B

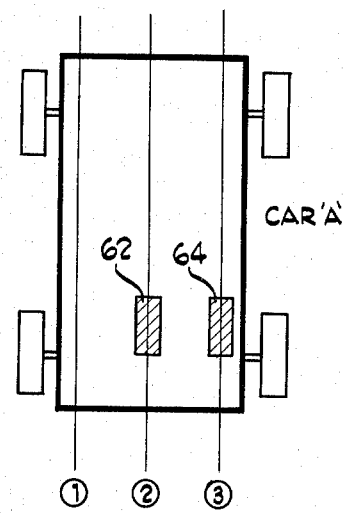
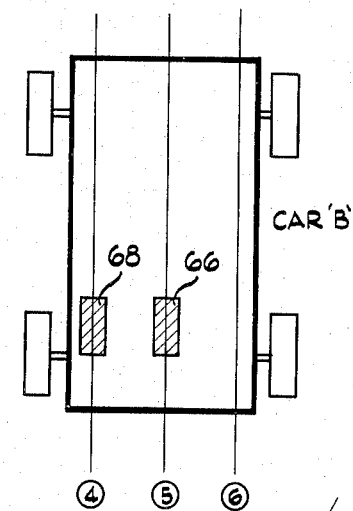
Fig 4
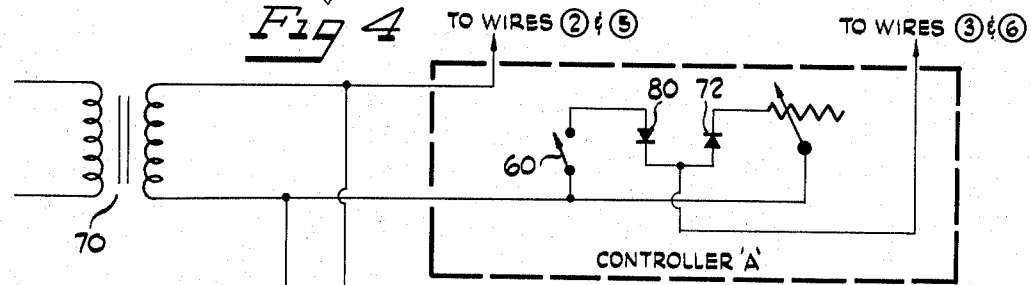
Fig 5
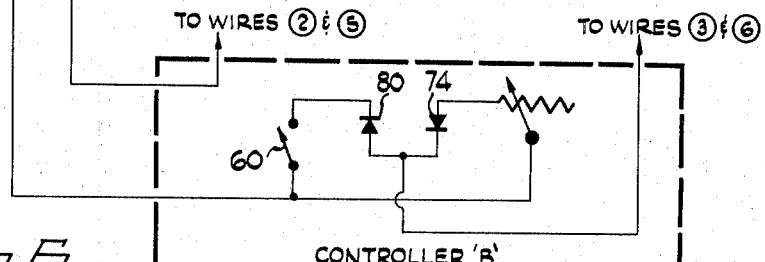
Fig 6
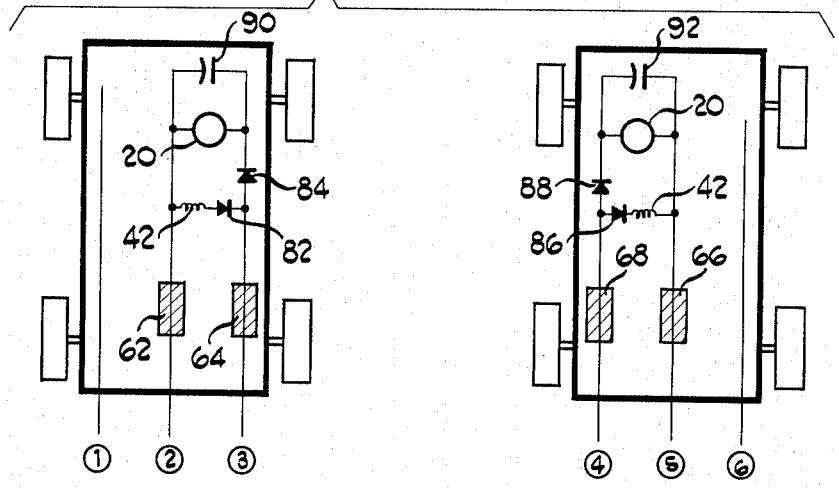

SYSTEM FOR OPERATING MINIATURE VEHICLES

BACKGROUND AND SUMMARY OF THE INVENTION

This invention relates to a system for simulating realistically in a toy, and through means of remote control, characteristics of the travel performance of actual road vehicles represented by miniature travelling replicas of the vehicles.

Model automobiles which are driven over toy tracks have become increasingly popular for some time, even more popular than electric trains operable over confining tracks. However, so many of the presently available road racing toys basically are merely extensions of the conventional electric train concept. The vehicles or systems therefor have become known as car" slot car"- systems wherein the model cars are constrained by virtue of slots and/or guides to a single dimensional or linear path. It is obvious that such a toy has limited realism in operation, since the only variable left for the operator is regulation of the speed of travel.

For realism in toys that simulate highway traffic, as differing from toys in the art of toy or model railroading, it is desirable that the miniature road vehicle be free to be steered arbitrarily at the will of the operator without confinement or guidance by upstanding track rails or by slots sunken in the roadbed to be travelled by the vehicle. Also for realism, the toy road vehicle should be steerable in a manner to turn out and pass one another along the route by crossing over from one traffic lane to another at the will of the operator while substantially continuously being propelled by current derived from the roadbed which is substantially flat throughout.

Attempts have been made to provide the operator with this second degree of freedom of operation provided by free steering of the vehicle. This invention is directed to providing a new and improved system for operating electrically propelled miniature vehicles along a predetermined path and for remotely controlling the vehicles in a manner to turn out and pass one another at the will of the operator.

It is, therefore, a general object of this invention to provide a toy of the character described, particularly such a toy which has more realistic operation and which includes an improved model vehicle movable over a three-dimensional substantially flat tread surface on a track.

The invention contemplates providing a roadbed travelled by the vehicle and having side-by-side current conductive lanes with substantially flush tread surfaces permitting the vehicles to be transferred freely from one lane to another. Each vehicle includes a body provided with at least one surface engaging driving wheel which is mounted on the vehicle body and is operable by an electrical current responsive propulsion motor also mounted on the vehicle body. Current collectors are mounted on the vehicle body and are operatively connected to the propulsion motor and in conductive contact with conductive portions of the current conductive lanes of the track. Separate remote control mechanisms are provided for each vehicle, are in circuit with the current conductive lanes, and are so constructed to permit each of the vehicles to be remotely controlled independently of the control of the other vehicle so as to permit an operator to selectively turn his respective vehicle out and pass another vehicle at will by remotely moving direction actuating means on the vehicle.

In the exemplary embodiment of the invention, lane bordering side walls are provided along the outer edges of the outermost current conductive lanes and electrically operated direction actuating means are provided on each vehicle for cooperating with the lane bordering side walls, by engagement therewith, to urge the vehicle toward the opposite lane in response to a surge of current through the current conductive lanes and the vehicle current collectors. In the preferred embodiment, a solenoid is provided on each vehicle, extending generally transversely thereacross. The direction actuating means comprises a pair of lever type flippers mounted slightly inwardly on opposite sides of the vehicle. The flippers are pivoted to the vehicle intermediate the ends of the levers for movement about generally vertical axes. One end of each of the levers comprises an armature for movement toward and away from the solenoid so as to pivot the opposite ends of the levers from a retracted position generally within the side bounds of the vehicle to a transversely extended position protruding from either side of the vehicle into engagement with a side wall of the particular outermost lane along which the vehicle is travelling. The vehicle is thus urged toward the opposite lane in response to a surge of current through the current conductive lanes and the vehicle current collectors to the solenoid.

Means also is provided to operatively disengage the propulsion motor from the driving wheel during the changing of lanes by the vehicle so that the vehicle will free-wheel from one lane to another. In the exemplary embodiment of the invention, a gear train is provided between the propulsion motor and the driving wheel and a momentum engaging, movably mounted idler gear is provided in the gear train. The idler gear is moved into meshed engagement in the gear train under the force of the propulsion motor to drive the vehicle, and is moved out of meshed engagement in the gear train by the momentum of the vehicle, through the gear train, when the current to the motor is cut by disengagement of the current collectors on the vehicle from the conductive portions of the respective current conductive lane along which the vehicle is travelling.

Other objects, features and advantages of the invention will be apparent from the following detailed description taken in connection with the accompanying drawings.

DESCRIPTION OF THE DRAWINGS

FIG. 1 is a top plan view of the chassis of a miniature vehicle made in accordance with the concepts of the present invention, with a horizontal section through the right rear wheel thereof;

FIG. 2 is a somewhat schematic elevational view of the gear train, including the idler gear, which operatively disengages the propulsion motor from the motor driving wheel when the vehicle changes lanes;

FIGS. 3A and 3B are schematic, cross views through two types of tracks which may be utilized with vehicles as generally shown herein;

FIG. 4 is a somewhat schematic view of a pair of vehicles on side-by-side current conductive lanes, showing the different positions of the current collectors thereof;

FIG. 5 is a circuit diagram for remotely controlling the vehicles of the present invention, through a six-contact, two-lane track as shown in FIG. 4; and FIG. 6 is a circuit diagram of the electrical components on a pair of individually operable vehicles for use on the track of FIG. 4 and operable by the control units of FIG. 5.

DETAILED DESCRIPTION OF THE INVENTION

Referring to the drawings in greater detail, a system according to the present invention for operating electrically propelled miniature vehicles along a predetermined path and for remotely controlling the vehicles in a manner to turn out and pass one another at the will of the operator is shown. The mechanical structure of the chassis of miniature vehicles made in accordance with the concepts of the present invention is shown in FIGS. 1 and 2, and the track and control circuits for utilizing the miniature vehicles are shown in FIGS. 3 through 6. The miniature vehicles first will be described.

Each miniature vehicle includes a chassis having a body or frame portion, generally designated 10, provided with a pair of surface engaging front wheels 12 mounted on a front axle 14. A pair of rear surface engaging driving wheels 15 are fixed for rotation with a rear axle 16 which is operatively connected to a gear train, generally designated 18, and, in turn, to an electrical current responsive propulsion motor 20 for rotating the rear driving wheels 14 to drive the vehicle forwardly, in the direction of arrow A (FIG. 1). Each rear wheel has a hub portion 22 about which is wrapped a more resilient tread portion 24.

The gear train 18, between the motor 20 and the rear driving wheels 14, includes a pinion gear 26 which is common to the drive shaft of the motor 20 and is rotatable thereby about a transverse axis. The gear 26 is in constant mesh with an idler gear 28 which is movable into and out of driving meshed engagement with a larger gear 30 fixed to the driven rear axle 16. The idler gear 28 has a slot 32 through which a pin 34 extends, the pin being fixed to a flange 36 (FIG. 1) and a plate 38 of the vehicle body or frame 10. The slot 32 should extend approximately concentric to the axis of rotation of the drive shaft gear 26 so that movement of the gear 28, as afforded by the pin 34 and slot 32 arrangement, does not move the idler gear 28 out of meshed engagement with the drive shaft gear 26. Thus, with this arrangement, and referring to FIG. 2, as the drive shaft gear 26 is driven by the motor 20 in the direction of arrow B, the idler gear 28 not only is rotated in the direction of arrow C but is urged bodily upwardly in the direction of arrow D into mesh with the rear axle gear 30 to drive the rear axle and rear driving wheels 14 in the direction of arrow E. When current to the motor 20 is cut, for instance as the vehicle changes lanes to disengage the vehicle's current collectors from the current conductive lane portions, the momentum of the vehicle (through the rear wheels 15 and the rear axle wheel 30 in the direction of arrow E) will force the idler gear 28 downwardly opposite the direction of arrow D so that the vehicle "free-wheels" toward the opposite lane until the motor again picks up current from the current conductive lane portions and drives the idler gear 28 back in mesh with the gear 30.

Details of one form of appropriate current collectors for the vehicles is shown in copending application Ser. No. 263,985 filed June 19, 1972, and assigned to the assignee of the present application, which is incorporated herein by reference.

The steering means for guiding the direction of movement of the vehicles of this invention include, in combination, lane bordering side walls 40 (FIGS. 1, 3 and 4) along the outer edges of the outermost current conductive lanes. Electrically operated direction actuating means is provided on each vehicle for cooperation with the side walls 40 of the track, particularly for engaging the side walls and urging the vehicle toward the opposite lane in response to a surge of current through the current conductive lanes and the vehicle current collectors, as described hereinafter. The direction actuating means includes a solenoid 42 mounted on each vehicle body 10 and extending generally transversely thereof. A pair of lever type flippers, generally designated 44, are pivotally mounted intermediate the ends of the flippers, as at 46, to the vehicle body 10 for pivotal movement about generally vertical axes. The rearward ends 48 of the flippers comprise armatures for movement toward and away from the ends of the solenoid 42 to pivot the forward ends 50 of the levers outwardly in the direction of arrows F (FIG. 1). Outwardly protruding arms 52 are fixed to the front ends 50 of the levers 44 to form generally L-shaped members as shown in FIG. 1. The arms 52 are movable from retracted positions generally within the side bounds of the vehicle (as shown by full lines in FIG. 1) to transversely extended positions protruding from the sides of the vehicle (as seen by the dotted lines in FIG. 1) for engaging a side wall 40 (depending on which lane the vehicle is travelling) and urging the vehicle toward the opposite lane. Movement of the levers 44, including their wall engaging arms 52 from the retracted to the extended positions, is effected by a surge of current through the solenoid 42, the current coming from a power source through the current conductive lanes of the track and the vehicle current collectors.

It immediately can be seen that with the structure of the flippers 44, the vehicle is steered toward and only toward the opposite lane of the track. This is readily seen from FIG. 1 because the lefthand arm 52 of the lefthand lever-type flipper 54 moves inwardly toward the center of the track without engaging any extraneous structure (i.e., lane bordering side walls). With the vehicle shown in FIG. 1, the righthand flipper 44 thus controls the steering of the vehicle, but only toward the lefthand lane of the track.

In order to hold a vehicle sufficiently close to the side walls 40 of the track to insure that the arms 52 of the flippers 44 will engage the adjacent respective side wall of the lane within which the vehicle is travelling, means are provided directly on the track. More particularly, as shown in FIG. 3A., relatively shallow grooves 54, generally of the width of the driving wheels 14, are provided adjacent the upstanding side walls 40 of the track. These grooves receive the adjacent side wheels of the vehicle and serve to hold the vehicle closely to the lane bordering side walls 40 along the outer edge of the respective lane of the track, whereby the arm 52 of the flipper 44 on the adjacent side of the vehicle will engage the side wall when current is pulsed through the solenoid 42. However, the grooves 54 are sufficiently shallow (e.g., in the order of 1/32 inches) as not to interfere with movement of the vehicle out of a particular lane toward the opposite lane. The lower track embodiment shown in FIG. 3B eliminates the grooves 54 and cants the side-by-side lanes of the track from a central crest 56 downwardly toward the side wall 40 thereby the vehicle sort of "leans" against the side wall to insure that the arms of the adjacent vehicle flipper will engage the side wall. It should be pointed out that the incline of the lane is exaggeratedly shown in FIG. 3A. Actually there is a "leaning" effect in the upper embodiment of FIG. 3A due to the height differential provided by the grooves 54.

FIGS. 5 and 6 show circuitry for a six-contact, two-lane track having two three-contact lanes side-by-side along the track. FIG. 4 shows that a two car track system is provided with two sets of three conductor track wires, the wires being numbered 1 through 6. Each operator of a vehicle has control over the speed of his car (car "A" or "B") by his own controller (controller "A" or "B") (FIG. 5). Additionally, each operator has the ability merely by pushing an extra normally open switch 60 (FIG. 5) on his controller to actuate the flippers 44 of his car to "flip" his car out of the lane of the track in which he is travelling and onto the opposite lane of the track. This function can be performed at any time and as often as desired completely independent of the other players action. By reference to FIG. 4, it can be seen that the track contact wipers or current collectors are so arranged that if conductors 2 and 5 are connected together each vehicle could still be proceeding forwardly at a controllable rate of speed even while both vehicles are in the same lane of the track, provided, however, that conductors 1 and 4 are provided with one polarity for car "B" and conductors 3 and 6 are provided with another polarity for car "A." Thus car "A" has a center current collector 62 for engaging either of the track conductors 2 or 5 and a right current collector 64 for engaging either of track conductors 3 and 6. Similarly, car "B" has a center current collector 66 for engaging the common conductors for both tracks, conductors 2 and 5, and a lefthand current collector 68 for engaging either of the track conductors 1 and 4, depending upon which lane car "B" is travelling.

Thus, referring to FIG. 5, it can be seen that from a single transformer 70 simultaneous control voltages of two opposite polarities can be supplied with respect to the common leg of the transformer. This is accomplished through the rectifying action of diode 72 in controller "A" for car "A" and diode 74 in controller "B" for car "B." FIG. 6 shows the wiring for both of the cars. The motors 20 in each car are electrically connected so as to run in a forward direction when the motor of car "A" receives positive electrical pulses on either track conductor 3 or 6 while the motor of car "B" moves forwardly when it receives negative pulses from either track conductor 1 or 4, each with respect to the common track conductors 2 or 5. Each car also is equipped with the solenoids 42, as wired in FIG. 6. As stated above, these solenoids activate the flipper levers 44 in such a way that a sudden activation of the solenoid will cause the flippers to strike the adjacent track side walls 40 and deflect the cars across the track and onto the opposite land and, thus, the other set of contacts. This is accomplished by a sudden closure of switches 60 of the controllers shown in FIG. 5, the switches being normally open. By the rectifying action of diode 80 of controller "A," the solenoid pulse for car "A" is negative and is passed by diode 82 of car "A" to the solenoid while it has no effect on the motor speed because of the blocking action of diode 84 on car "A." Similarly, car "B" can be deflected across the track by closing its normally open switch 60 and applying a positive pulse to track conductors 1 and 4 passing through diode 86 into solenoid 42. Diode 88 blocks these pulses thus preventing interaction with the motor 20 in car "B".

Since the motor in each car is a small D. C. type motor and since the power is supplied to the track conductors in pulses at a 60 c.p.s. rate, smoothing capacitors 90 and 92 for cars "A" and "B," respectively, are used as filters to supply sufficient torque to the motors without overheating the same.

The foregoing detailed description has been given for clearness of understanding only and no unnecessary limitations should be understood therefrom as some modifications will be obvious to those skilled in he art.

1. A system for operating electrically propelled miniature vehicles along a predetermined path and for remotely controlling the vehicles in a manner to turn out and pass one another at the will of the operator, said vehicles each including a body providing with at least one surface engaging driving wheel on said body, an electrical current responsive propulsion motor on said body for operating said driving wheel, a roadbed travelled by said vehicles having side-by-side current conductive lanes with substantially flush tread surfaces permitting said vehicles to transfer from one lane to another, current collectors on said vehicles operatively connected to the respective propulsion motors and in conductive contact with at least a portion of either of said lanes, the improvement comprising steering means for guiding the direction of movement of the vehicle, including, in combination, lane bordering side wall means along the outer edges of the outermost lanes, and electrically operated direction actuating means on the vehicle and operatively connected to said current collectors for movement from a retracted position generally within the side bounds of the vehicle to a transversely extended position protruding from either side of the vehicle for engaging said side wall means and urging the vehicle toward the opposite lane in response to a surge of current through the current conductive lanes and the vehicle current collectors.

2. The invention of claim 1 including a solenoid on said vehicle in circuit with said current collectors and operatively associated with said direction actuating means to move the same from the retracted to the extended positions due to the magnetic field created by the solenoid in response to said surge of current.

3. The invention of claim 2 wherein said direction actuating means comprises a pair of lever-type flippers mounted adjacent the opposite sides of the vehicle, one end of each lever comprising an armature for movement toward and away from the solenoid to pivot the opposite ends of the levers to the extended positions into engagement with said side wall means.

4. The invention of claim 3 including biasing means to normally urge said opposite ends of the levers toward their retracted positions.

5. The invention of claim 1 including means to operatively disengage the propulsion motor from the driving wheel during the changing of lanes by the vehicle so that the vehicle will free wheel from one lane to the other.

6. The invention of claim 5 including a gear train between the propulsion motor and the driving wheel and a momentum engaging movably mounted idler gear in said gear train, the idler gear being moved into meshed engagement in the gear train under the force of the propulsion motor and moved out of meshed engagement by the momentum of the gear train when the current to the motor is cut by disengagement of the current collectors from said portion of the respective current conductive lane, when the vehicle changes lanes.

7. The invention of claim 1 including circuit means connected to a source of current and to said current conductive lanes and having circuit components operatively associated with said current conductive lanes and said vehicle current collectors so as to permit operators of a pair of vehicles to control the amount of current to the solenoid of a respective vehicle independently of the control of current to the solenoid of the other vehicle.

8. A system for operating electrically propelled miniature vehicles along a predetermined path and for remotely controlling the vehicles in a manner to turn out and pass one another at the will of the operator, said vehicles each including a body provided with at least one surface engaging drive wheel, and a propulsion motor for driving said drive wheel, a roadbed travelled by said vehicles and having side-by-lanes with substantially flush tread surfaces permitting said vehicles to transfer from one lane to another, steering means for guiding the direction of movement of each vehicle, including lane bordering side wall means along the outer edges of the outermost lanes and electrically operated direction actuating means on the vehicle for movement from a retracted position generally within the side bounds of the vehicle to a transversely extended position protruding from either side of the vehicle for engaging the side wall means and urging the vehicle toward the opposite lane, and remote control means operatively associated with each of said vehicles to remotely control the direction actuating means on a respective vehicle independently of the control of the direction actuating means of any other vehicle so as to permit an operator to selectively turn his respective vehicle out and pass another vehicle at will by remotely moving the direction actuating means from said retracted position to said extended position into engagement with said side wall means.

* * * * *